United States Patent
Aboulnaga

(10) Patent No.: US 11,961,684 B1
(45) Date of Patent: Apr. 16, 2024

(54) ENERGY STORAGE IN A MINIMIZED VARIABLE CAPACITANCE SYSTEM USING CAPACITOR WITH DISTANCE-MOVABLE PLATES

(71) Applicant: KING FAISAL UNIVERSITY, Al-Ahsa (SA)

(72) Inventor: Aly Ahmed Aboulnaga, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/229,262

(22) Filed: Aug. 2, 2023

(51) Int. Cl.
| | |
|---|---|
| H01G 5/16 | (2006.01) |
| H02M 3/335 | (2006.01) |
| H02N 1/08 | (2006.01) |
| H02N 11/00 | (2006.01) |

(52) U.S. Cl.
CPC .......... H01G 5/16 (2013.01); H02M 3/33584 (2013.01)

(58) Field of Classification Search
CPC .... H02J 50/001; H01G 5/16; H02M 3/33584; H02K 7/1085; H02N 1/08; H02N 3/00
USPC .......... 310/10, 300, 308; 322/2 A; 361/277, 361/287, 289–290
See application file for complete search history.

(56) References Cited

U.S. PATENT DOCUMENTS

| | | |
|---|---|---|
| 464,667 A | 12/1891 | Tesla |
| 3,412,318 A * | 11/1968 | Robinson ................ H02N 1/08 310/168 |

(Continued)

FOREIGN PATENT DOCUMENTS

| | | | | |
|---|---|---|---|---|
| JP | 11-098868 | * | 4/1999 | ............ H02N 11/00 |
| JP | 5418607 B2 | | 2/2014 | |
| KR | 10-1046533 B1 | | 6/2011 | |

OTHER PUBLICATIONS

H. R. Florentino, R. C. S. Freire, S. Y. C. Catunda, A. V. S. Sá and D. G. Atunda, "Energy harvesting circuit using variable capacitor for power systems," 2011 IEEE International Instrumentation and Measurement Technology Conference, Hangzhou, China, 2011, pp. 1-4, doi: 10.1109/IMTC.2011.5944071.

(Continued)

*Primary Examiner* — Burton S Mullins
(74) *Attorney, Agent, or Firm* — Nath, Goldberg & Meyer; Richard C. Litman

(57) ABSTRACT

A capacitive system provides adjustable electrical potential output using first and second capacitive plates maintained in a parallel and opposed relationship, while permitting the separation distance of the first and second capacitive plates to change. A drive mechanism is used to increasing the separation distance between the capacitive plates, so that an increase in separation distance renders a decreased capacitance, and with the capacitive plates charged relative to each other, the increase in separation distance renders an increase in potential across the capacitive plates. A bidirectional DC-DC voltage converter transfers current to and from the capacitor. By providing the initial charge to the capacitor at a first separation, the increase in separation provides the increase in potential across the capacitive plates, and in the output mode, the bidirectional DC-DC voltage converter outputs increased potential from the capacitor, thereby increasing the output potential of the capacitor in the output mode.

5 Claims, 4 Drawing Sheets

(56) References Cited

U.S. PATENT DOCUMENTS

| | | | | |
|---|---|---|---|---|
| 3,621,377 | A * | 11/1971 | Lim | H02M 3/18 361/279 |
| 5,553,828 | A * | 9/1996 | Jaenker | F15B 21/065 251/129.01 |
| 6,127,812 | A | 10/2000 | Ghezzo et al. | |
| 6,434,028 | B1 * | 8/2002 | Takeuchi | H02M 3/07 363/59 |
| 6,690,568 | B2 * | 2/2004 | Johnson | H01G 5/0132 361/298.1 |
| 6,936,994 | B1 * | 8/2005 | Gimlan | B60L 8/006 320/101 |
| 6,966,225 | B1 * | 11/2005 | Mallary | G01P 15/125 73/514.32 |
| 7,088,567 | B2 * | 8/2006 | Hunt | H01G 5/0132 361/290 |
| 7,781,935 | B2 * | 8/2010 | Jager | H02N 1/08 310/309 |
| 7,872,851 | B2 * | 1/2011 | Lohndorf | B60C 23/041 361/278 |
| 8,441,167 | B2 * | 5/2013 | Verkoglyad | H02N 1/08 310/309 |
| 8,618,715 | B2 | 12/2013 | Shimanouchi et al. | |
| 8,710,793 | B2 | 4/2014 | Despesse | |
| 9,548,619 | B2 * | 1/2017 | Gazit | H02J 7/0018 |
| 10,958,192 | B2 * | 3/2021 | Joye | H02N 1/04 |
| 11,114,951 | B2 * | 9/2021 | Reitz | H02N 1/002 |
| 11,496,059 | B2 * | 11/2022 | Fink | H02M 3/33584 |
| 2004/0007877 | A1 * | 1/2004 | Boland | H02N 1/08 290/1 R |
| 2009/0185325 | A1 | 7/2009 | Park et al. | |
| 2010/0043867 | A1 * | 2/2010 | Peng | F03G 6/06 136/248 |
| 2010/0246088 | A1 | 9/2010 | Shimanouchi et al. | |
| 2012/0126756 | A1 * | 5/2012 | Vranish | H02N 1/08 320/166 |
| 2014/0041468 | A1 * | 2/2014 | Yukitake | H02K 7/116 74/89 |
| 2014/0285945 | A1 * | 9/2014 | Liang | H01G 5/00 361/289 |

OTHER PUBLICATIONS

Aydogdu, "Variable Capacitor Based Mechanical Energy-to-Electrical Energy Converter", Institute of Engineering and Sciences of Bilkent University, Ankara, Türkiye (Aug. 2007).

James Kirk, et al., "Mechanical Capacitor", NASA Technical Note D-8185 (Mar. 1976).

F. Harerimana; H. Peng; M. Otobo; F. Luo; M. N. Gikunda; J. M. Mangum; V. P. LaBella; P. M. Thibado, "Efficient circuit design for low power energy harvesting", AIP Publishing, vol. 10, Issue 10, Oct. 5, 2020.

* cited by examiner

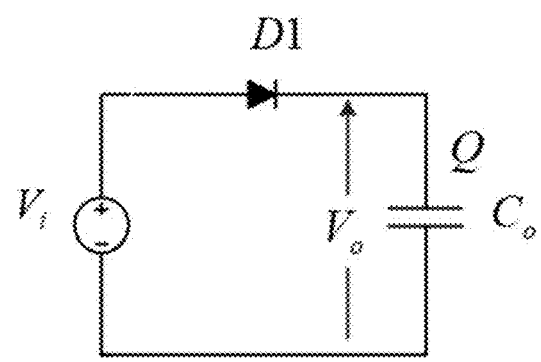
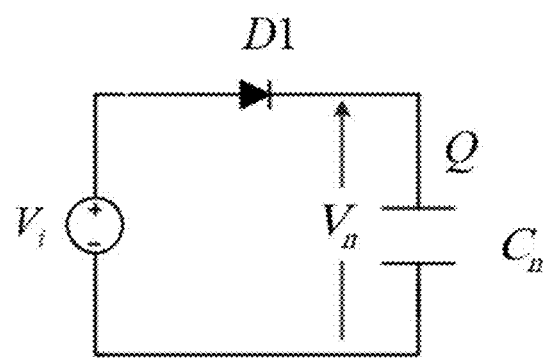
FIG. 1A  FIG. 1B

ENERGY STORAGE IN A MINIMIZED VARIABLE CAPACITANCE SYSTEM USING CAPACITOR WITH DISTANCE-MOVABLE PLATES

BACKGROUND

Technical Field

The present disclosure relates to a variable capacitor in which a distance between plates is varied in order to vary the potential across the capacitor for purposes of voltage control and energy storage.

Background Art

In a capacitor, the energy is stored in a system with low capacitance with constant electrostatic charges such that the potential (voltage) is changed to a higher value. In theory, energy stored in a capacitor is proportional to the square of the applied potential on the capacitor. A familiar type of variable capacitor uses rotary plates, and is commonly used for resistor-capacitor (R-C) resonance tuning such as in radio frequency (RF) tuners.

Capacitors in which a plate is displaced to change the distance between plates for energy harvesting, in a circuit which includes a variable capacitor, are known. In some configurations, one plate is fixed and the second plate is capable of moving toward and away from the fixed plate thereby providing energy storage functions, achieved by changing the separation between capacitor plates. The utilized mechanical energy to move the plates apart from each other is stored in the form of electrostatic energy.

SUMMARY

Adjustable electric potential output is provided in a capacitive system having first and second capacitive plates, in which the second capacitive plate is positioned parallel to the first capacitive plate and in opposition to the first capacitive plate. A linkage maintains the first and second capacitive plates in a parallel and opposed relationship, while permitting the separation of the first and second capacitive plates to change. To provide an increased potential output, a drive mechanism is used to increase the separation distance between the first and second capacitive plates, with the first and second capacitive plates being maintained in a parallel and opposed relationship. An increase in separation distance renders a decreased capacitance, such that, with the capacitive plates charged relative to each other, the increase in separation distance renders an increase in potential across the capacitive plates. A bidirectional current transfer circuit provides a current transfer connection to and from the capacitor, so that, in a forward mode, the bidirectional current transfer circuit charges the capacitor to provide an initial charge to the capacitor, and in an output mode, discharges the capacitor.

In a particular configuration, a bidirectional direct current-direct current (DC-DC) voltage converter provides current transfer to and from the capacitor, so that, in a forward mode, the bidirectional DC-DC voltage converter charges the capacitor to provide an initial charge to the capacitor, and in an output mode, discharges the capacitor. By providing the initial charge to the capacitor at a first separation, the increase in separation provides the increase in potential across the capacitive plates. In the output mode, the bidirectional DC-DC voltage converter outputs potential from the capacitor at the increased potential, thereby increasing the output potential of the capacitor in the output mode.

BRIEF DESCRIPTION OF THE DRAWINGS

FIGS. 1A and 1B are electrical schematic diagrams showing the potential across a capacitor, as related to a variation in the separation of the plates.

DETAILED DESCRIPTION

Figure 2:
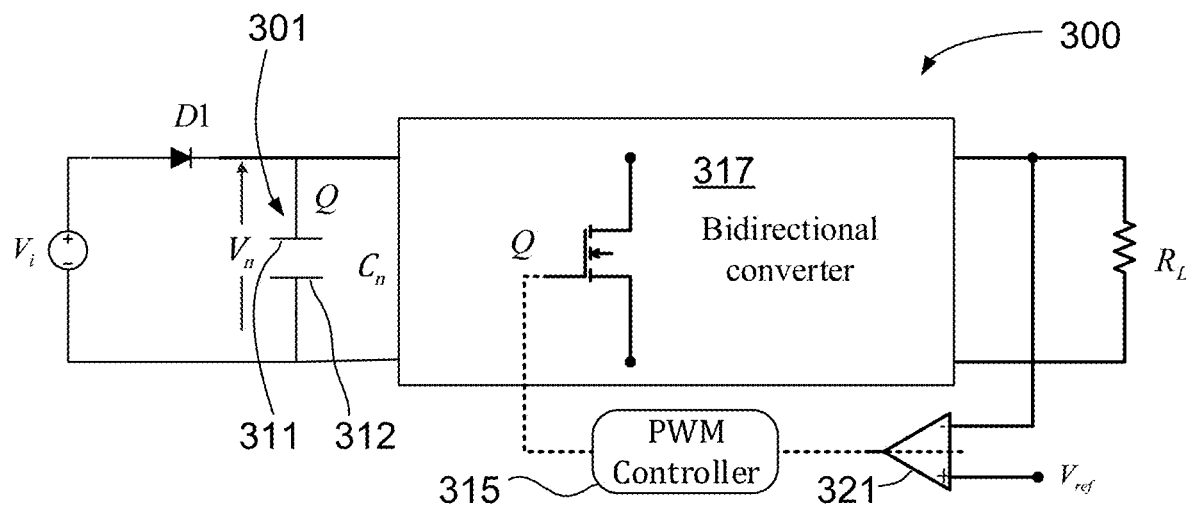
FIG. 2 is a schematic circuit diagram showing a charging and discharge circuit for controlling charging and discharging of a distance-movable plate variable capacitor.

The present disclosure relates to a type of variable capacitor in which a distance between plates is varied by using distance-movable plates in order to vary the potential (voltage) across the capacitor. The variable potential is the result of the total electrostatic charge of the capacitor being theoretically constant, resulting in the potential between the plates linearly increasing with distance. When the separation of the charged plates of the capacitor is increased, the capacitance of the capacitor is reduced, but the potential (the voltage) between the plates is increased. The resulting change in capacitance results in a linear increase in potential, but the energy stored being proportional to the square of the applied potential.

The disclosed technology implements a capacitive system capable of providing adjustable electrical potential output. A first capacitive plate is provided and a second capacitive plate is positioned parallel to the first capacitive plate and in opposition to the first capacitive plate. A linkage maintains the first and second capacitive plates in a parallel and opposed relationship, while permitting the separation distance of the first and second capacitive plates to change. A drive mechanism is capable of increasing the separation distance between the first and second capacitive plates with the first and second capacitive plates maintained in a parallel and opposed relationship, whereby an increase in separation distance renders a decreased capacitance, such that, with the capacitive plates charged relative to each other, the increase in separation distance renders an increase in potential across the capacitive plates.

A bidirectional current transfer circuit is used to provide current transfer to and from the capacitor, so that, in a forward mode, the bidirectional current transfer circuit charges the capacitor to provide an initial charge to the capacitor, and in an output mode, discharges the capacitor. By providing the initial charge to the capacitor at a first separation distance, the increase in separation distance provides the increase in potential across the capacitive plates, and in the output mode, the bidirectional current transfer circuit outputs potential from the capacitor at the increased potential, thereby increasing the output potential of the capacitor in the output mode.

The bidirectional current transfer circuit can be implemented as a bidirectional DC-DC voltage converter, so that, in a forward mode, the bidirectional DC-DC voltage converter charges the capacitor to provide the initial charge to the capacitor, and in an output mode, discharges the capacitor.

In one non-limiting configuration, the drive mechanism is implemented as a motor drive. The motor drive can be implemented as motor, such as a linear motor, and an electromagnetic clutch.

In another non-limiting configuration, the drive mechanism is implemented as a hydraulic pump forcing electrical insulating oil between the two plates.

The capacitive system can be constructed by combining multiple ones of said bidirectional DC-DC voltage converters connected in series to provide their output potential from the capacitor at the increased potential, thereby further increasing the output potential in the output mode corresponding to the series connection. Similarly, the capacitive system can be constructed by combining multiple ones of said bidirectional DC-DC voltage converters connected in parallel.

In a capacitor, the energy is stored in a system with low capacitance with constant electrostatic charges such that the potential is changed to a higher value. According to the disclosed technique, a capacitor is charged with large amount of charge at very low potential. The available excess energy is used to increase the distance between the two plates such that the capacitance is then minimized while the electric charge is constant across the capacitor.

The energy stored is proportional to the square of the applied potential on the capacitor. The energy is stored in a system with low capacitance with constant electrostatic charges such that the potential is changed to a higher value. The disclosed technique is implemented by charging a capacitor with a large amount of charges at very low potential and the available excess energy is used to increase the distance between the two plates such that the capacitance in now is minimized while the electric charge is constant inside the capacitor.

A variable capacitor is constructed in which a distance between plates is varied in order to vary the potential across the capacitor. The variable potential is the result of the total electrostatic charge of the capacitor and is theoretically constant, resulting in the potential between the plates linearly increasing with distance. The separation distance of the plates is increased by charging the capacitor, resulting in reducing the capacitance, but increasing the potential. The resulting change in capacitance and potential between the plates results in the linear increase in potential, but the energy stored is proportional to the square of the applied potential.

In one configuration, one plate or electrode is fixed and a second plate is movable so as to change the distance between the plates.

In the disclosed capacitor of the present subject matter, the energy is stored in a system with low capacitance with constant electrostatic charges such that, if the capacitance is changed by separation of the plates, the potential is changed to a higher value. According to the disclosed technique, a capacitor is charged with large amount of charge at very low potential. The available excess energy is used to increase the distance between the two plates such that the capacitance is then minimized while the electric charge is constant across the capacitor.

The energy stored is proportional to the square of the applied potential on the capacitor. The energy is stored in a system with low capacitance with constant electrostatic charges such that the potential is changed to a higher value. The disclosed technique is implemented by charging a capacitor with a large amount of changes at very low potential and the available excess energy is used to increase the distance between the two plates such that the capacitance in now is minimized while the electric charge is constant inside the capacitor.

Storing the initial energy is done at low potential and high current to store the highest possible electric charges. Excess energy is stored by separating the capacitor plates either mechanically by forced air, or forced electrical insulating oil between the two plates. When the energy is needed, a pulse-width modulator (PWM) DC to DC converter can be used to convert the higher potential in the capacitor to a desired system output potential.

The plates are separated, e.g., by lifting the upper plate, using excess energy. As a result, the capacitance is reduced but the potential is increased, such that the potential between the two plates is linearly increased with distance. The plates are also maintained in a parallel and opposed relationship.

Storing the initial energy is done at low potential and high current to store the highest possible electric charges. Excess energy is stored by separating the capacitor plates either mechanically by forced air, or forced oil such as electrical insulating oil between the two plates. When the energy is needed, a PWM DC to DC converter can be used to convert the higher potential in the capacitor to a desired system output potential.

It is usual to store energy in large capacitors (super capacitors); i.e., capacitors that have high capacitance. Additionally, if the potential capability of the capacitor is high, the energy stored can also be increased. The amount of energy stored in the capacitor can be represented by the following equations:

$$E = \frac{1}{2}QV[J] \qquad \text{(eqn. 1)}$$

where E is the energy stored in the capacitor in Joules, Q is the amount of the electric charge on the plates of the capacitor in Coulombs (C), and V is the potentials between the two plates of the capacitor in volts.

Noting that the ratio between Q and V is always constant and called the capacitance of the capacitor C, which is measured in Farads (F).

$$C = \frac{Q}{V}[F] \qquad \text{(eqn. 2)}$$

The energy can be rewritten as follows.

$$E = \frac{1}{2}\frac{Q^2}{2C}[J] \qquad \text{(eqn. 3)}$$

$$E = \frac{1}{2}CV[J] \qquad \text{(eqn. 4)}$$

Equation (2) implies that if the electric charges Q is constant, the energy stored in the capacitor is increased if the capacitance is decreased. In other words, the energy is inversely proportional to the capacitance if the electric charge is maintained constant. In the present disclosure, the excess energy is stored in a system with low capacitance with constant electrostatic charges. Thus, if the capacitance is reduced, the potential of the capacitor is increased to a higher value.

The disclosed technology provides a technique for charging a capacitor with a large amount of electric charges at very low potential. FIGS. 1A and 1B are electrical schematic diagrams showing the potential across a capacitor, as related to a variation in the separation distance of the plates. As represented in FIG. 1A, the initial capacitance of the capacitor is relatively high to accommodate the high number of the electric charge across the plates. In FIG. 1B, the capacitance is decreased from that of FIG. 1A, because the distance between the plates is increased. As the capacitance decreases, the potential across the plates increases.

In other words, the potential (voltage) difference across the plates increases as the plate separation distance is increased, so the potential difference across the plates in increased. This corresponds to how closely the circuitry follows the theoretical ideal, but a close approximation to the ideal circuit can be achieved with appropriate circuitry. Thus, the potential across a distance-movable plate capacitor can be increased by increasing the separation distance of the plates. For example, if the initial capacitor is 0.1 F at lowest possible distance and the charge on the capacitor charges is 1 C, the potential on the capacitor equal 10V. If the capacitance is reduced to 0.01F, the potential between the two plates is increased 10-fold and the energy stored is goes up by 10-fold. Note that the energy stored is proportional to the square of the applied potential on the capacitor.

The procedure for increasing the potential is accomplished by:
1. Charge the capacitor and disconnect it from the supply.
2. Pull the plates apart by a method that does not allow charge to leak away.

In order to effect this increase in potential, work must be done to overcome the force of attraction between the plates. This results in an increase in V between the plates and since $$C = \frac{Q}{V}[F],$$

C decreases.

Since the electrostatic charge across the plates (ideally) remains constant, the potential increases. If the capacitor is charged to a given potential, the two plates hold charge carriers of opposite charge. Opposite charges attract each other, creating an electric field, and the electrostatic field is stronger the closer they are. Available excess energy is used to increase the distance between the two plates of the capacitor. The capacitance is then minimized while the electric charge is constant inside the capacitor.

To accomplish this voltage change, the separation distance of the plates is mechanically changed by using the excess energy. In a non-limiting example, one plate of the capacitor is kept fixed and the other is separated from the fixed plate mechanically using the excess energy. As a result, the capacitance of the capacitor is reduced but the potential is increased. The potential between the two plates is linearly increased with distance.

As a non-limiting example, a capacitor is built with a high permittivity material with the smallest possible thickness and the largest possible area to achieve the highest possible initial capacitance. According to the voltage limit (or potential limit) of this capacitor, the capacitor is charged with the highest initial electric charge at the highest possible initial potential. This is reflected in the equation for a parallel plate capacitor:

$$E = \frac{\varepsilon A}{d_o}[F] \qquad \text{(eqn. 5)}$$

where $\varepsilon$ is the permittivity of the isolation material, A is the area of each plate of the capacitor, and do is the initial distance between the two plates.

There are two techniques to maximize the stored energy of the capacitor. The first technique is to increase the capacitance at the maximum possible potential, which allows more charge to be stored in the capacitor. This follows three basic requirements: increasing the area of the plate, use a good insulation material with high dielectric permittivity $\varepsilon$, and reduce the thickness between the plates. In this case the capacitor stores more energy, usually at lower potential. As per the following equation.

$$E = \frac{1}{2}CV^2[J] \qquad \text{(eqn. 6)}$$

The second technique is reduce the capacitance at the maximum possible charge, which allows the potential on the capacitor to increase and store more energy in the capacitor. This is essentially the reverse of what is explained above (the first technique) in connection with increasing the capacitance at the maximum possible potential. This presents three basic requirements:
1. reduce the area of the plate,
2. reduce the dielectric permittivity c of the insulation material, and
3. increase the distance between the plates.

In this case the capacitor stores more energy at higher potential per the following equation.

$$E = \frac{1}{2}\frac{Q^2}{C}[J] \qquad \text{(eqn. 7)}$$

The disclosed technique integrates the above two conditions to store the energy and maximize it as follows.
  The initial capacitor is constructed with a high permittivity material with the possible smallest thickness, and use the largest possible area to achieve the highest possible initial capacitance. According to the potential limit of this capacitor, the capacitor is charged with highest initial electric charge at the highest possible initial potential.
  When the capacitor is fully charged, the potential source is then disconnected. It is now possible to store more energy in this capacitor if we can reduce the capacitance of the capacitor. To reduce the capacitance, the two electrodes can be pulled mechanically far from each other as represented in the change from FIG. 1A to FIG. 1B; i.e., to increase the distance between the two plates. This is achieved by applying external mechanical force. Of courses, this mechanical energy will be stored in the capacitor as electrical energy.
  The capacitor is now charged at a constant charge. Once the distance between the two electrodes, the potential of the capacitor is increased. This will eventually result in increasing the total electric energy stored in the capacitor.

The required mechanical force is required to counteract the electrostatic force between the two plates. This energy is then stored in the capacitor, since the potential in the capacitor is increased. The more distance between the two plates, the lower the capacitance and the higher the potential of the capacitor and the higher the stored energy.

This would not result in an increase the charge in the capacitor after the initial charge because additional electrical current is not provided. Instead, function of the circuit is to maintain constant charge during the variation of the capacitance of the capacitor. The energy is stored by increasing the potential difference between the two plates, according to the following equation:

$$E = \frac{1}{2}QV[J] \qquad \text{(eqn. 8)}$$

As stated, the bidirectional converter is working in two modes: the first is the forward mode at which the capacitor is charged at low potential. The second is an output mode, at which energy in the capacitor is discharge at high potential.

To reduce the capacitance, the distance between the two plates is increased by pulling the plates apart mechanically as in FIGS. 1A and B. This results in the increase in the potential of the capacitor. Since mechanical energy is also applied to force the separation of the plates, the total electric energy stored in the capacitor increases but this requires additional energy be provided in order to overcome the electrostatic force between the two plates when separating the plates. This energy is then stored in the capacitor, since the potential in the capacitor is increased. As distance between the two plates is increased, the capacitance is lowered and the potential across of the capacitor is increased, resulting in an increase in the stored energy. Additionally, the stored energy can be further increased by removing a the high permeability layer, which results in further reducing the capacitance of the capacitor.

FIG. 2 is a schematic circuit diagram showing a non-limiting example of a charging and discharge circuit 300 for controlling charging and discharging of a distance-movable plate variable capacitor 301. A first plate 311 of the capacitor can be moved toward or away from a second plate 312, either mechanically, by forced air, forced electrical insulating oil, or magnetic attraction. When the energy is needed, PWM DC-DC controller 315 is used to convert a higher potential in the capacitor to a desired potential level by driving bidirectional DC-DC voltage converter 317.

Bidirectional DC-DC voltage converter 317 functions as a bidirectional current transfer circuit to transfer current to and from capacitor 301. PWM DC-DC converter 315 is controlled by PWM controller amplifier 321, which responds to capacitor output potential or an external potential which is supplied with power from variable capacitor 301.

The circuits including PWM DC-DC converters 315, which may be cascaded in a series connection or connected in parallel. By connecting these capacitors in parallel is possible to store excess energy. Rooftops are suitable places for harvesting this storage systems and charging and discharge circuit 300 allows the high voltage, such as 600 volts or greater, to be isolated from inadvertent access by residents and workers in order to meet safety codes. The system with the charging and discharge circuits 300 can be connected to the utility or to a renewable energy source or a hybrid or standalone energy system, as represented by $R_L$.

Figure 3:
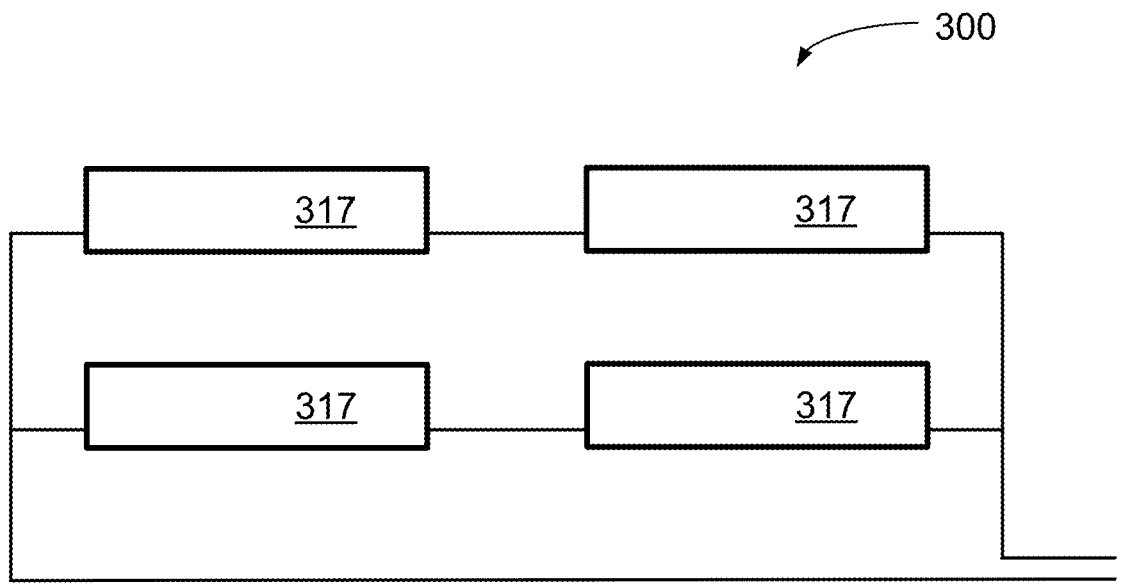
FIG. 3 is a schematic block diagram showing series and parallel connections, in which multiple voltage converters 317 are connected in series and in parallel

FIG. 3 is a schematic block diagram showing series and parallel connections, in which multiple ones of said bidirectional DC-DC voltage converters 317 are connected in series and in parallel to provide their output potential from the capacitor at the increased potential, thereby further increasing the output potential in the output mode corresponding to the series or parallel connections.

Figure 4:
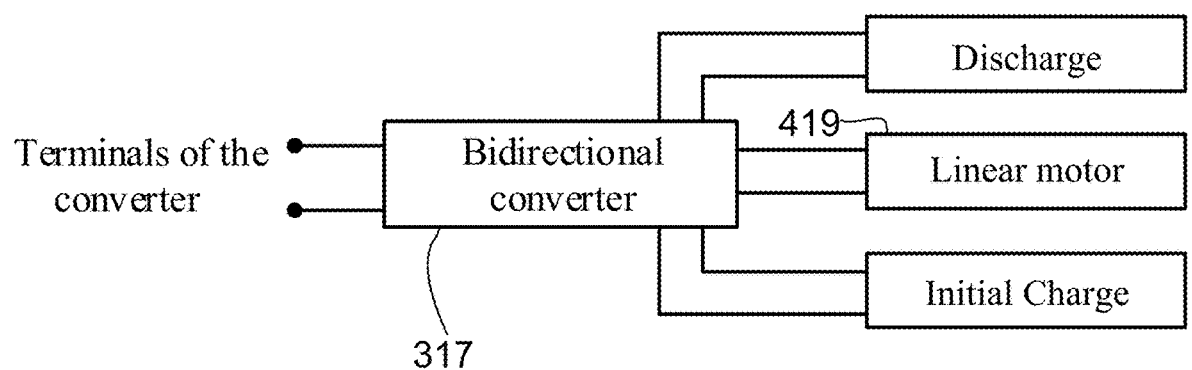
FIG. 4 is a schematic block diagram showing energy utilization using a distance-movable plate variable capacitor.

FIG. 4 is a schematic block diagram showing energy utilization using the described distance-movable plate variable capacitor. Depicted are bidirectional DC-DC voltage converter 311. Bidirectional DC-DC voltage converter 311 is responsive to discharge, and drives a motor drive such as a linear motor 419 for driving the movable capacitor plate, and is responsive to an initial charge.

Bidirectional DC-DC voltage converter 311 works in two modes. The first mode is the forward mode at which the capacitor is charged at low potential, which is the initial charge. The second mode is the output mode, at which energy in the capacitor is discharged at high potential. It is noted that bidirectional DC-DC voltage converter 311 may be disconnected from this capacitor during the energy storage process or otherwise may be inactive during the energy storing process. Bidirectional DC-DC voltage converter 311 can then be switched to act on linear motor 419, which separates the two plates and increases the distance between the two plates to increase potential across the plates and thereby store more energy. Linear motor 419 provides a driving force to effect this separation.

Referring to FIGS. 2 and 3, the operating modes of the charging and discharge circuit 300 are:
1. Forward Mode: Bidirectional DC-DC voltage converter 311 is working in the forward mode to initially charge the capacitor with the maximum possible charge when the distance between the two plates is set at the minimum value. After that, bidirectional DC-DC voltage converter 311 is disconnected from the capacitor.
2. Energy Storage Mode: Bidirectional DC-DC voltage converter 311 operates the forward mode to supply linear motor 419, which increases the mechanical distance between the two capacitor plates to store more energy in the capacitor. During this mode the mechanical energy provided by linear motor 419 is converted to electrical energy by increasing the potential between the plates. Once the distance between the two plates reached a desired separation of the maximum possible value, linear motor 419 is stopped and the plates of the capacitor are maintained at this condition by locking them mechanically.
3. Output Mode: Bidirectional DC-DC voltage converter 311 is then connected to the capacitor to discharge its energy when needed. When the capacitor is fully discharged, the electrostatic force between the two plates becomes zero and minimal energy required to return the two plates to the initial condition.

Figure 5:
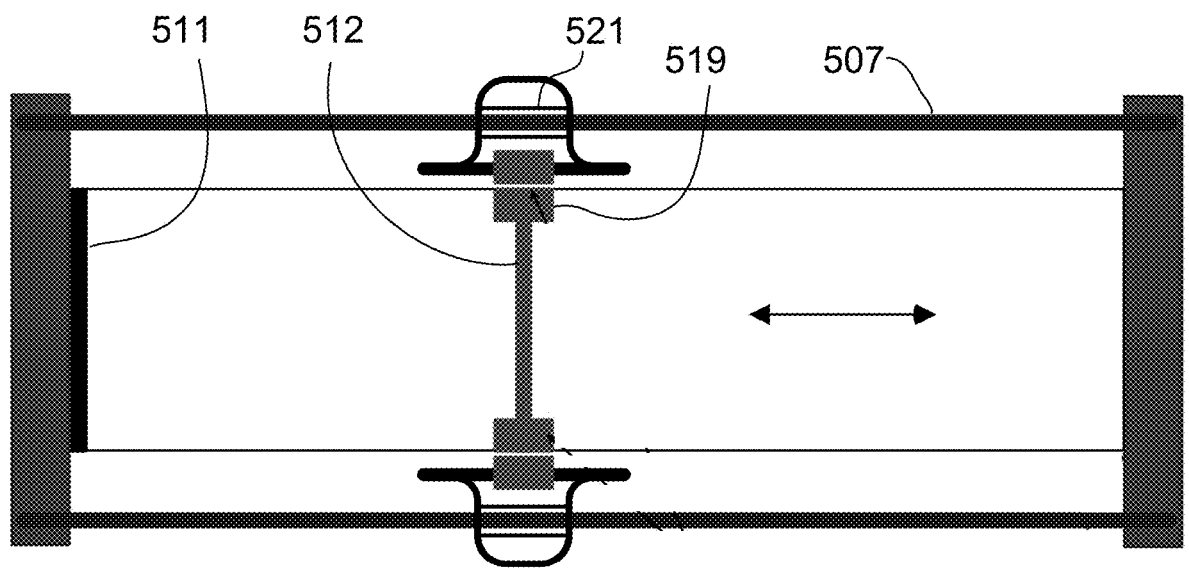
FIG. 5 is a schematic diagram showing a non-limiting example of mechanical activation of a movable plate in a distance-movable plate variable capacitor.

FIG. 5 is a schematic diagram showing a non-limiting example of mechanical activation of a movable plate in a distance-movable plate variable capacitor. Depicted are frame 507, stationary plate 511, movable plate 512, a motor drive, such as, by way of non-limiting example, linear motor 519 and electromagnetic clutch 521. While plate 511 is shown as fixed with plate 512 movable, this arrangement is given by non-limiting example. The separation of plates can also be controlled by moving both plates relative to each other.

The energy stored in the capacitor is stored in form of high potential. For this reason, is desirable to isolate plates 511, 512, which have a high potential differential, from motor 515 used to control the distance between the two plates 511, 512. Isolation between motor 515 which operates at low potential and the high potential on the capacitor is also required for safety and maintenance purposes and to meet safety code in non restricted environments. This is can be achieved by allocating the two plates 511, 512 in an isolated container. While plate 511 is shown as fixed in position and may be electrically grounded this is given as a non limiting example. In this non limiting example, movable plate 512 is mechanically attached to linear motor 512 via electromagnetic clutch 521.

Plates 511 and 512 are movable with respect to each other, to allow them to separate; however, plates 511, 512 are linked so as to maintain plates 611, 612 in a parallel relationship to each other and are maintained in an opposed relationship with each other. Plates 511, 512 are mounted to frame 507 and driven by linear motor 519 in a manner so as to maintain this parallel opposed relationship. Linear motor 519 provides the force to separate plates 515, 512 and thereby increase the distance between plates 515, 512. The precise manner of maintaining the parallel opposed relationship is a matter of design choice and can be achieved by linear motor 519, a gear or lever arrangement (not shown), the alignment of movable plate 512 on frame 507, or any other convenient linkage or means of maintaining the parallel opposed relationship.

Figure 6:
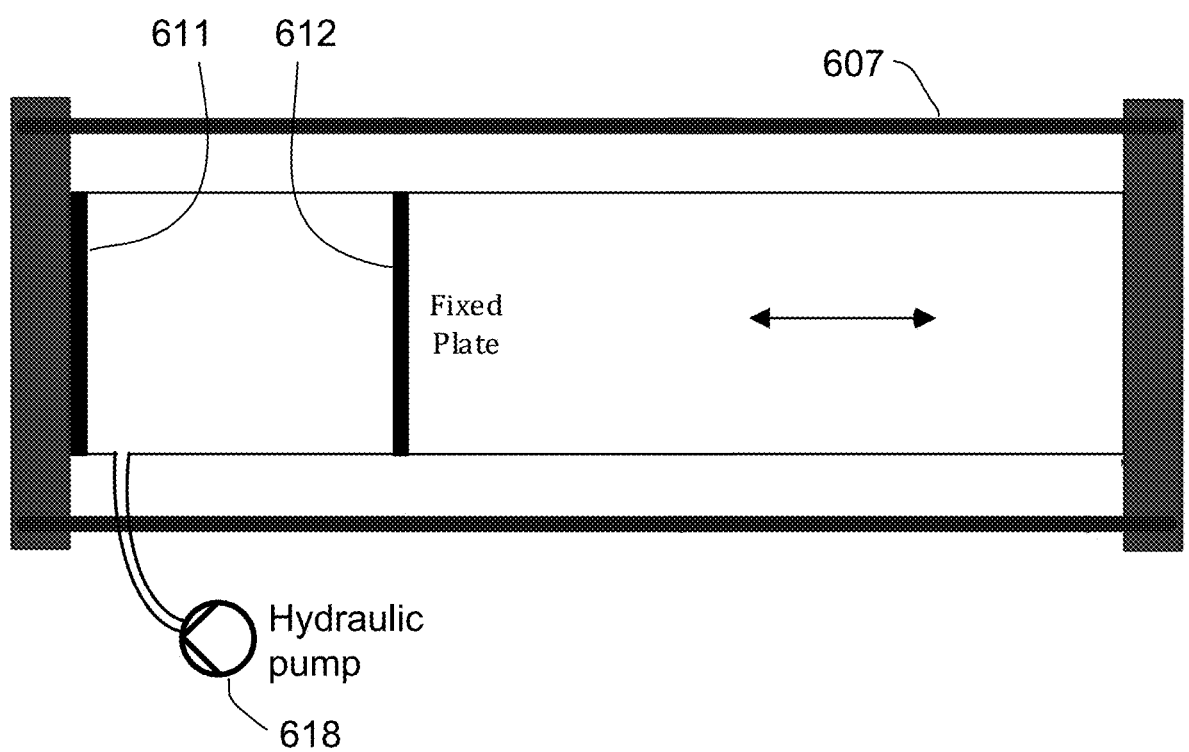
FIG. 6 is a schematic diagram showing a non-limiting example of mechanical activation of a movable plate in a distance-movable plate variable capacitor using electrical insulating oil.

Another methodology to increase the distance between the two plates is push electrical insulating oil between the two plates. FIG. 6 is a schematic diagram showing a non-limiting example of mechanical activation of a movable plate in a distance-movable plate variable capacitor using electrical insulating oil. Depicted are frame 607, stationary plate 611, movable plate 612, hydraulic pump 618 and oil line 619.

Force exerted by hydraulic pressure from pump 618 is used to separate movable plate 612 from fixed plate 611 up until it reaches a locked position. Pump 618 provides a driving force to effect this separation and thereby increase the distance between plates 615, 612. If movable plate 612 is locked, the electrical insulating oil may be drained out to further reduce the capacitance between the two plates 611, 612. The relative permittivity ε of electrical insulating oil such as transformer oil is approximately 2.1-2.4 F m$^{-1}$. As a result, the capacitance will be reduced by the same amount and therefore the stored energy will increase by the same factor.

In the configuration of FIG. 6, linear motor 519 in FIG. 5 is replaced by hydraulic pump 618 as shown in FIG. 6. Hydraulic pump 618 has three actions:
1. The first action is to lift up the plate through pumping the electrical insulating oil into the capacitor container. To increase the distance between the plates until the upper plate is locked at the maximum position.
2. The second action is to drain out the electrical insulating oil to reduce the capacitance and increased the stored energy.
3. The third action is to push back the electrical insulating oil on the other side of the movable plate when the energy is consumed from the capacitor. This will return the plate to the original position and make ready to for new energy storage cycle.

Plates 611 and 612 are movable with respect to each other, to allow them to separate; however, plates 611, 612 are linked so as to maintain plates 611, 612 in a parallel relationship to each other and are maintained in an opposed relationship with each other. Plates 611, 612 are mounted to frame 607 and allowed to change their separation in a manner so as to maintain this parallel opposed relationship. The precise manner of maintaining the parallel opposed relationship is a matter of design choice and can be achieved by a gear or lever arrangement (not shown), the alignment of movable plate 612 on frame 607, or any other convenient linkage or means of maintaining the parallel opposed relationship.

By connecting these capacitors in parallel it is possible to store excess energy. Rooftops are suitable places for harvesting this storage systems and charging and discharge circuit 300 allows the high voltage, such as 600 volts or greater, to be isolated from inadvertent access by residents and workers in order to meet safety codes. The system with the charging and discharge circuits 300 can be connected to the utility or to a renewable energy source or any hybrid or standalone energy systems.

CLOSING STATEMENT

Advantages of the disclosed technology include, but are not limited by:
1. The capacitor is connected to a bidirectional DC-DC converter such that capacitor is charged at a lower potential and the energy is discharged at high potential after the energy is stored. As a result, one converter is used for both charging and discharging.
2. The high potential plate is moved by a electromagnetic clutch and linear motor to maintain it isolated from the mechanical movement system due to the high potential on the plate.
3. The high potential plate can be also moved up by forced electrical insulating oil. While the high potential plate is maintained in position, the forced electrical insulating oil can be then drained to further reduce the capacitance and increase the potential level as well as the stored energy.
4. Series and parallel cascaded systems can be connected together to evenly distribute the high potential on several unit. One linear motor and several electromagnetic clutches can be used for the mechanical movements.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:
1. A capacitive system capable of providing adjustable electrical potential output, comprising:
   a first capacitive plate;
   a second capacitive plate positioned parallel to the first capacitive plate and in opposition to the first capacitive plate;
   a linkage to maintain the first and second capacitive plates in a parallel and opposed relationship, while permitting the separation distance of the first and second capacitive plates to change;
   a drive mechanism capable of increasing the separation distance between the first and second capacitive plates with the first and second capacitive plates maintained in a parallel and opposed relationship forming a capacitor, the drive mechanism comprising an hydraulic pump forcing electrical insulating oil between the two plates; and a bidirectional current transfer circuit comprising a bidirectional DC-DC voltage converter providing a bidirectional DC-DC current transfer connection to and from the capacitor, so that, in a forward mode, the bidirectional current transfer circuit charges the capacitor to provide an initial charge to the capacitor, and in an output mode, discharges the capacitor, wherein by providing the initial charge to the capacitor at a first separation distance, the increasing of separation distance from the first separation distance provides an increase in potential across the capacitive plates, and in the output mode, the bidirectional current transfer circuit outputs potential from the capacitor at the increased potential, thereby increasing the output potential of the capacitor in the output mode, whereby an increase in separation distance renders a decreased capacitance, such that, with the capacitive plates charged relative to each other, the increase in separation distance renders the increase in potential across the capacitive plates.

2. The capacitive system of claim 1, further comprising multiple ones of said bidirectional DC-DC voltage converters connected in series to provide their output potential from the capacitor at the increased potential, thereby further increasing the output potential in the output mode corresponding to the series connection.

3. The capacitive system of claim 1, further comprising multiple ones of said bidirectional DC-DC voltage converters connected in parallel.

4. A method of using capacitive storage to provide adjustable electrical potential output, the method comprising:

providing a capacitor with distance-movable plates, in which first and second capacitor plates maintain a parallel and opposed relationship, with a variable separation distance between the capacitor plates, and maintain the first and second capacitive plates in the parallel and opposed relationship, while permitting the separation of the first and second capacitive plates to change;

providing a drive mechanism to vary the separation distance between the first and second capacitive plates with the first and second capacitive plates maintained in a parallel and opposed relationship to form a capacitor by forcing electrical insulating oil between the two plates, the drive mechanism comprising an hydraulic pump, whereby an increase in the separation distance renders a decreased capacitance, such that, with the capacitive plates charged relative to each other, the increase in separation renders an increase in potential across the capacitive plates; and providing current transfer to and from the capacitor in a forward mode in an initial charge to the capacitor using a bidirectional DC-DC voltage converter which, in the forward mode, the bidirectional DC-DC voltage converter provides current to charge the capacitor to provide the initial charge to the capacitor, and in an output mode, discharge the capacitor, wherein by providing the initial charge to the capacitor at a first separation distance, the increase in the separation distance provides the increase in potential across the capacitive plates, and in the output mode, the current transfer outputs potential from the capacitor at the increased potential, thereby increasing the output potential of the capacitor in the output mode.

5. A capacitive system capable of providing adjustable electrical potential output, comprising:

a first capacitive plate;

a second capacitive plate positioned parallel to the first capacitive plate and in opposition to the first capacitive plate;

means for maintaining the first and second capacitive plates in a parallel and opposed relationship, while permitting a separation distance of the first and second capacitive plates to change;

drive means to increase the separation distance between the first and second capacitive plates with the first and second capacitive plates maintained in a parallel and opposed relationship forming a capacitor, the drive mechanism comprising an hydraulic pump forcing electrical insulating oil between the two plates; and bidirectional current transfer circuit means comprising a bidirectional DC-DC voltage converter providing a bidirectional DC-DC current transfer connection to and from the capacitor, so that, in a forward mode, the bidirectional current transfer circuit means charges the capacitor to provide an initial charge to the capacitor, and in an output mode, discharges the capacitor, wherein by providing the initial charge to the capacitor at the first separation distance, the increasing of separation distance from the first separation distance provides an increase in potential across the capacitive plates, and in the output mode, the bidirectional current transfer circuit means outputs potential from the capacitor at the increased potential, thereby increasing the output potential of the capacitor in the output mode, whereby an increase in separation distance renders a decreased capacitance, such that, with the capacitive plates charged relative to each other, the increase in separation distance renders the increase in potential across the capacitive plates, wherein by providing the initial charge to the capacitor at the first separation distance, the increase in separation distance provides the increase in potential across the capacitive plates, and in the output mode, the means to provide current transfer outputs potential from the capacitor at the increased potential, thereby increasing the output potential of the capacitor in the output mode.

* * * * *